US011133685B2

United States Patent
Kamijima

(10) Patent No.: US 11,133,685 B2
(45) Date of Patent: Sep. 28, 2021

(54) ELECTRONIC DEVICE FOR CHARGING A BATTERY, INCLUDING USE ENVIRONMENT DETECTION

(71) Applicant: Panasonic Intellectual Property Management Co., Ltd., Osaka (JP)

(72) Inventor: Junya Kamijima, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 157 days.

(21) Appl. No.: 16/558,834

(22) Filed: Sep. 3, 2019

(65) Prior Publication Data

US 2020/0006964 A1 Jan. 2, 2020

Related U.S. Application Data

(63) Continuation of application No. PCT/JP2017/025864, filed on Jul. 18, 2017.

(30) Foreign Application Priority Data

Mar. 7, 2017 (JP) .............................. JP2017-043024

(51) Int. Cl.
*H01M 10/46* (2006.01)
*H02J 7/00* (2006.01)
(Continued)

(52) U.S. Cl.
CPC ......... *H02J 7/0027* (2013.01); *H01M 10/425* (2013.01); *H01M 10/44* (2013.01); *H02J 7/007* (2013.01); *H02J 7/0022* (2013.01)

(58) Field of Classification Search
CPC .... H02J 7/007; H02J 7/0063; H02J 7/007182; H02J 7/007188; H01M 10/44; H01M 10/46; H01M 10/425; Y02E 60/10
(Continued)

(56) References Cited

U.S. PATENT DOCUMENTS

| 2009/0088992 | A1 | 4/2009 | Matsumura |
| 2015/0015208 | A1* | 1/2015 | Katsumata ................ B60L 3/04 320/136 |
| 2017/0302090 | A1* | 10/2017 | Han .................... H01M 10/486 |

FOREIGN PATENT DOCUMENTS

| JP | 2007-014068 A | 1/2007 |
| JP | 2009-037760 A | 2/2009 |

(Continued)

OTHER PUBLICATIONS

International Search Report for corresponding Application No. PCT/JP2017/025864, dated Aug. 29, 2017.

*Primary Examiner* — Edward Tso
(74) *Attorney, Agent, or Firm* — Renner, Otto, Boisselle & Sklar, LLP

(57) ABSTRACT

An electronic device charges a battery. The electronic device includes a charging circuit, a power supply controller, and a detector. The charging circuit charges the battery. The power supply controller controls charging of the battery performed by the charging circuit. The detector detects information about a use environment where the electronic device is used. When the power supply controller determines that the use environment for the electronic device is a specific environment based on the information detected by the detector, the power supply controller regulates the charging performed by the charging circuit.

7 Claims, 5 Drawing Sheets

(51) Int. Cl.
*H01M 10/42* (2006.01)
*H01M 10/44* (2006.01)

(58) Field of Classification Search
USPC ........ 320/107, 114, 127, 128, 132, 135, 150
See application file for complete search history.

(56) References Cited

FOREIGN PATENT DOCUMENTS

| | | | |
|---|---|---|---|
| JP | 2010-539642 | A | 12/2010 |
| JP | 2014-212594 | A | 11/2014 |
| WO | 2009045934 | A2 | 4/2009 |

* cited by examiner

ELECTRONIC DEVICE FOR CHARGING A BATTERY, INCLUDING USE ENVIRONMENT DETECTION

BACKGROUND

1. Technical Field

The present disclosure relates to an electronic device capable of charging a battery.

2. Description of the Related Art

Patent Literature (PTL) 1 discloses a system for intelligent battery safety management. The system of PTL 1 is configured to collect data regarding operation of a battery cell included in a battery pack when the battery pack is attached to an electronic device, compare the collected data with a set of battery reference data, and determine whether or not the battery cell is non-authentic or defective based on the comparison between the collected data and the battery reference data. According to PTL 1, when the system determines that the battery cell is non-authentic or defective, the system halts charging of the battery pack or allows the battery pack to discharge. The system thereby provides safety management during operation of the electronic device.

Here, PTL 1 is Unexamined Japanese Patent Publication No. 2010-539642.

SUMMARY

The present disclosure provides an electronic device designed to reduce risk involved in use of the electronic device capable of charging a battery.

According to an aspect of the present disclosure, provided is a rechargeable electronic device. The electronic device includes a charging circuit, a power supply controller, and a detector. The charging circuit charges the battery. The power supply controller controls charging of the battery performed by the charging circuit. The detector detects information about a use environment where the electronic device is used. When the power supply controller determines that the use environment for the electronic device is a specific environment based on the information detected by the detector, the power supply controller regulates the charging performed by the charging circuit.

The electronic device according to the present disclosure regulates charging of the battery when sensing that the use environment for the electronic device is the specific environment. This configuration provides a reduction in risk involved in the use of the electronic device capable of charging the battery.

DETAILED DESCRIPTION

Exemplary embodiments will be described in detail below with reference to the drawings as appropriate. However, detailed description more than necessary may be omitted. For example, detailed description of well-known matters and redundant description of structures that are substantially the same may be omitted. This is to avoid unnecessary redundancy in the following description and to facilitate understanding by those skilled in the art.

The inventor(s) have provided the accompanying drawings and the following description to allow those skilled in the art to fully understand the present disclosure. Accordingly, these examples should not be construed to limit the spirit and scope of the appended claims.

First Exemplary Embodiment

An information processing device of a first exemplary embodiment will be described as an example of an electronic device according to the present disclosure.

1. Configuration

Figure 1:
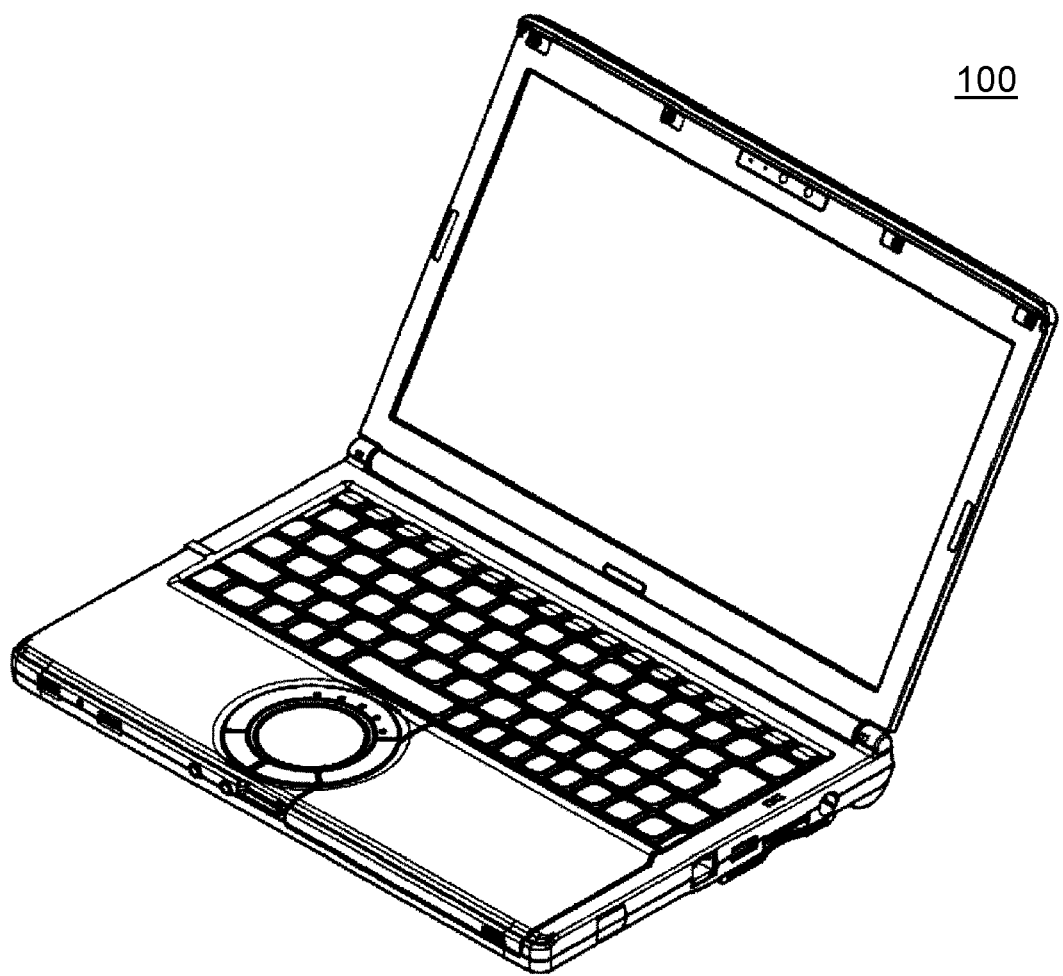
FIG. 1 is an external view illustrating an example of an electronic device according to a first exemplary embodiment of the present disclosure.
Figure 2:
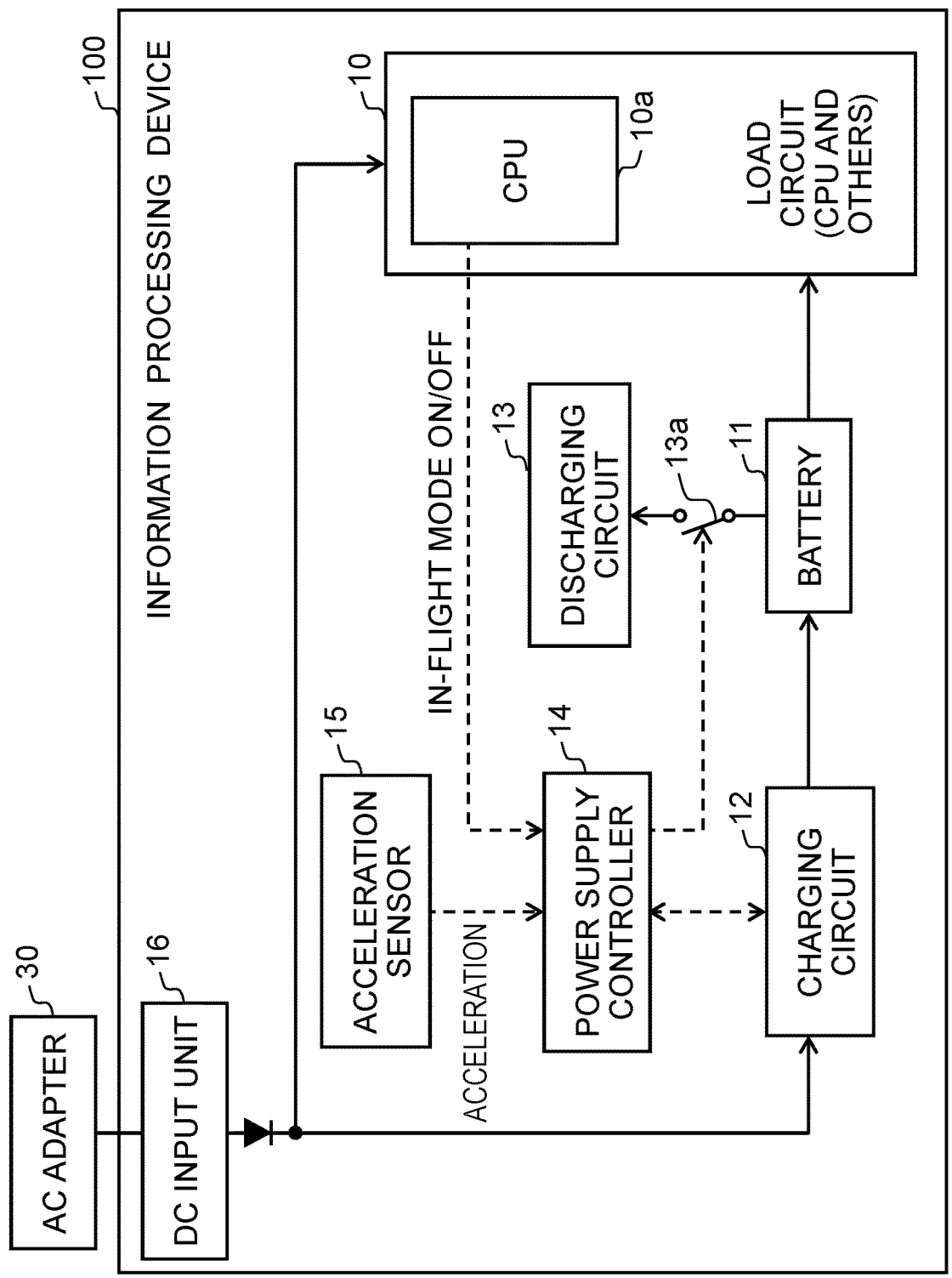
FIG. 2 is a block diagram illustrating a configuration of the electronic device according to the first exemplary embodiment.

With reference to FIGS. 1 and 2, a configuration of the information processing device according to the first exemplary embodiment will be described.

FIG. 1 is an external view illustrating an example of information processing device 100 according to the present exemplary embodiment. As shown in FIG. 1, information processing device 100 is, for example, a notebook PC (personal computer), an example of an electronic device that processes various kinds of information using electric power from a rechargeable battery. Information processing device 100 may be any mobile terminal of every sort and kind, such as a tablet terminal, a smartphone, or a cellular phone, other than the notebook PC.

This exemplary embodiment is provided on an assumption that information processing device 100 is used in various environments such as a situation in which a user is carrying information processing device 100 and taking an airplane, a Shinkansen train, or other public transportation. At the same time, it is assumed that information processing device 100 is charged by an external power source or something similar.

FIG. 2 is a block diagram illustrating a configuration of information processing device 100. FIG. 2 illustrates particularly a configuration related to charging operation performed by information processing device 100. As shown in FIG. 2, information processing device 100 includes load circuit 10, battery 11, charging circuit 12, discharging circuit 13, switch 13a, power supply controller 14, acceleration sensor 15, and direct current (DC) input unit 16.

Load circuit 10 includes central processing unit (CPU) 10a, a volatile storage device (a random-access memory (RAM)), and a non-volatile storage device (a read-only memory (ROM), a solid state disk (SSD), etc.). An operating system (OS), various application programs, various kinds of data, and the like are stored in the non-volatile storage device (ROM, SSD, etc.). CPU 10a reads the OS, and any of the application programs and the various kinds of data and executes arithmetic processing to implement various functions. For instance, CPU 10a functions as an information transmitter to transmit a predetermined item of information to power supply controller 14.

Load circuit 10 further includes various circuits to let information processing device 100 function as a computer. For instance, load circuit 10 includes a display device to display various kind of information, an input device to allow the user to input commands, and a communication interface for wireless communication.

Battery 11 is formed of a rechargeable secondary battery such as a lithium-ion battery. Battery 11 supplies electric power according to a charged voltage (a battery voltage) to load circuit 10. Battery 11 may be detachable from a main body of information processing device 100. In this case, information processing device 100 allows replacement of battery 11.

Charging circuit 12 is a circuit used to charge battery 11. In response to a voltage supplied, for example, from DC input unit 16, charging circuit 12 generates a voltage (a charge voltage) to charge battery 11 under control of power supply controller 14.

Discharging circuit 13 is a circuit used to discharge a battery voltage charged in battery 11. Switch 13a changes a state of connection between discharging circuit 13 and battery 11. Discharging circuit 13 does not discharge the battery voltage if switch 13a is turned off, and discharging circuit 13 discharges the battery voltage if switch 13a is turned on.

Power supply controller 14 is an example of a power supply controller configured to control charging and discharging of battery 11. Power supply controller 14 is, for example, configured with a microcontroller that enables programming. Power supply controller 14 acquires various kinds of information from acceleration sensor 15, CPU 10a of load circuit 10, and other parts. Power supply controller 14 controls charging circuit 12, as well as discharging circuit 13 and switch 13a. Power supply controller 14, for example, acquires information about the battery voltage charged in battery 11 via charging circuit 12 to manage a charging amount (a remaining amount) of battery 11.

Acceleration sensor 15 is, for example, a sensor device capable of detecting acceleration along predetermined one axis. Acceleration sensor 15 is, for example, fixed to inside information processing device 100. Acceleration sensor 15, for example, generates a detection signal in response to a rate of acceleration along the one axis described above. Acceleration sensor 15 is an example of a detector in this exemplary embodiment. Acceleration sensor 15 may be, for example, capable of detecting acceleration along three axes, other than acceleration along the one axis.

Information processing device 100 according to this exemplary embodiment can be connected to alternating current (AC) adapter 30 that converts a voltage from a commercial power supply into a predetermined DC voltage. DC input unit 16 is used to input the DC voltage from AC adapter 30 when AC adapter 30 is connected to information processing device 100. DC input unit 16 is, for example, an input terminal.

2. Operation

Operation of information processing device 100 configured as described above will now be described.

Information processing device 100 according to this exemplary embodiment starts charging battery 11 when the user, for example, connects the commercial power supply with information processing device 100 through AC adapter 30.

In information processing device 100, charging circuit 12 outputs a charge voltage to charge battery 11 in response to a DC voltage sent from DC input unit 16. Power supply controller 14 gives a target level (e.g., 4.3 V) set for the charge voltage in advance to charging circuit 12.

During charging of battery 11, power supply controller 14, for example, increases the charge voltage output from charging circuit 12 until the charge voltage reaches the target level, and then controls charging circuit 12 to keep the charge voltage at a constant voltage. During this operation, power supply controller 14, for example, monitors the battery voltage charged in battery 11 via charging circuit 12 and completes charging when the battery voltage reaches the target level described above.

Information processing device 100 can charge battery 11 as described above in various environments where the commercial power supply is available for use.

From the viewpoint of risk of ignition caused by batteries in mobile terminals and other devices, ensuring the safety of these devices has been emphasized in recent years, such as prohibitions imposed on the charging of mobile terminals, the use of other devices, or carrying-in of these devices especially in airplanes and other public transportation systems. It is conceivable that the risk of ignition or other danger created by a battery depends on energy density inside the battery and varies according to a voltage (battery voltage) charged in the battery.

Hence, information processing device 100 according to this exemplary embodiment automatically regulates charging of battery 11 if information processing device 100 is inside a conveyance such as an airplane and thereby lowers the battery voltage to a level adequately below an upper limit (a charging regulation process). This configuration reduces the risk of ignition of battery 11. After that, when the power supply controller determines that information processing device 100 is not inside the airplane or another conveyance, information processing device 100 according to this exemplary embodiment removes the charging regulation described above (a charging regulation removal process).

Details of the operation performed by information processing device 100 according to this exemplary embodiment will now be described.

2-1. Charging Regulation Process

Figure 3:
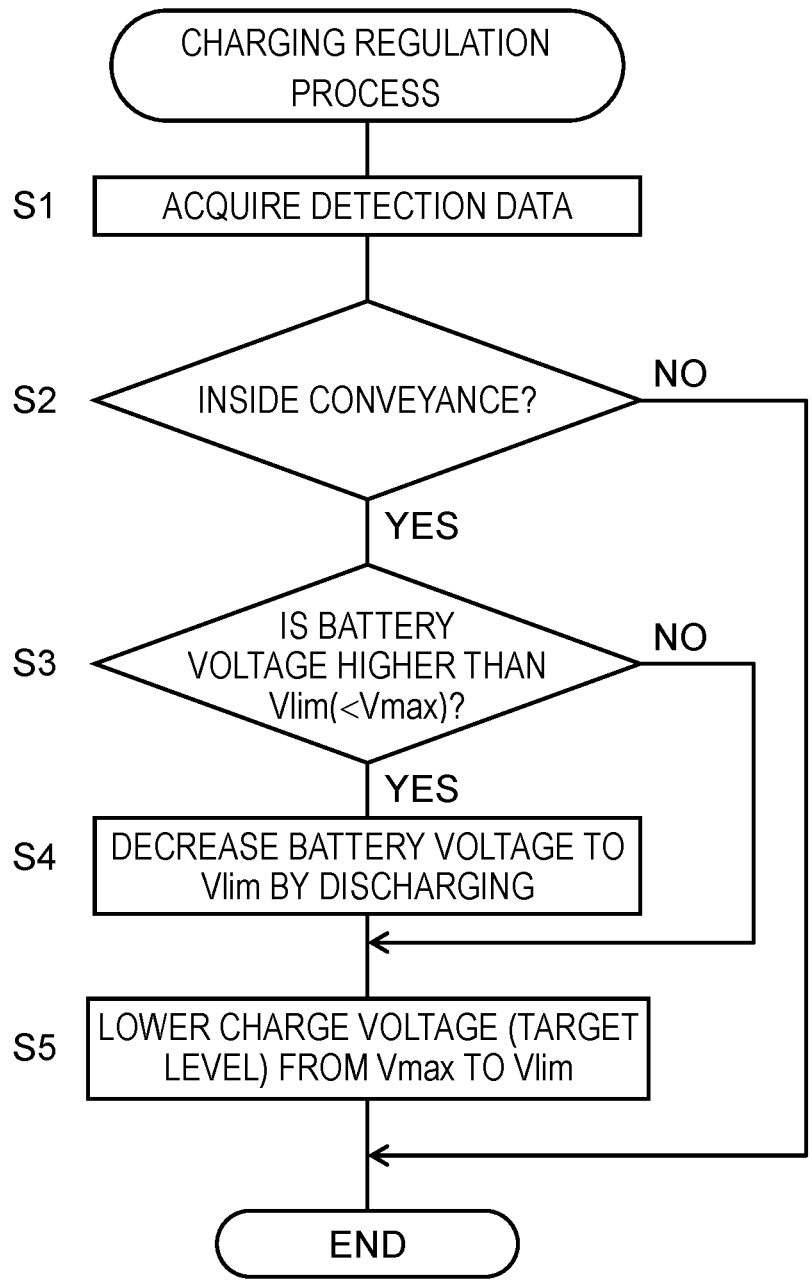
FIG. 3 is a flowchart illustrating a charging regulation process executed by the electronic device according to the first exemplary embodiment.

With reference to FIG. 3, a charging regulation process executed by information processing device 100 according to this exemplary embodiment to regulate charging of battery 11 in a conveyance such as an airplane will be described.

FIG. 3 is a flowchart illustrating a charging regulation process in this exemplary embodiment. The process of the flowchart in FIG. 3 is, for example, executed at predetermined intervals (e.g., 1 second) if information processing device 100 is not put into a charging regulation mode described later.

Each step in the flowchart of FIG. 3 is executed by power supply controller 14 of information processing device 100. CPU 10a and other components of load circuit 10 may be each turned on or off during execution of this flowchart. At the start of this flowchart, battery voltage upper limit Vmax set as a target level for the charge voltage is given to charging circuit 12.

First, power supply controller 14 acquires information about a use environment for information processing device 100 from each detector in information processing device 100

(S1). The use environment is an external environment where information processing device 100 is used.

In this instance, the detector, for example, detects whether or not the information processing device is inside an airplane or another conveyance as the use environment. Thus, power supply controller 14 acquires a degree of acceleration detected by acceleration sensor 15 (FIG. 2) as detected data.

Power supply controller 14 may acquire information concerning a setting of an in-flight mode as detected data about the use environment. The in-flight mode is an operation mode used to preclude information processing device 100 from establishing wireless communication during the use of information processing device 100 in an airplane in order to avoid interference with communication devices in the airplane. For instance, when the user turns on the in-flight mode, CPU 10a in information processing device 100 transmits notice to inform power supply controller 14 that the in-flight mode is on.

Next, power supply controller 14 determines whether or not information processing device 100 is inside the conveyance based on the acquired detection data (S2). For instance, if the in-flight mode is on, power supply controller 14 determines that information processing device 100 is inside the conveyance ("Yes" in step S2).

Power supply controller 14 compares the rate of acceleration detected by acceleration sensor 15 with a predetermined threshold and if the detected acceleration rate is higher than or equal to the threshold, determines that information processing device 100 is inside the conveyance ("Yes" in step S2). The threshold is a reference value that indicates a rate of acceleration in accordance with traveling of the conveyance subject to detection, such as acceleration at which an airplane takes off.

When power supply controller 14 does not determines that information processing device 100 is inside the conveyance ("No" in step S2), this process ends. Power supply controller 14 repeats steps S1, S2 to monitor the environment in which information processing device 100 is used.

When power supply controller 14 determines that information processing device 100 is inside the conveyance ("Yes" in step S2), power supply controller 14 determines whether or not the battery voltage of battery 11 at present exceeds predetermined level Vlim (S3). Predetermined level Vlim is a value that is set within a range lower than battery voltage upper limit Vmax in view of assurance of safety inside the conveyance and that is set as appropriate depending on factors such as an energy density that satisfactorily reduces the risk of ignition of battery 11. For instance, if battery voltage upper limit Vmax=4.3 V, predetermined level Vlim is, for example, set to 4.0 V.

If power supply controller 14 determines that the battery voltage is higher than predetermined level Vlim ("Yes" in step S3), power supply controller 14 controls discharging of battery 11 to decrease the battery voltage to predetermined level Vlim (S4).

Specifically, in step S4, power supply controller 14 turns on switch 13a for discharging circuit 13 (FIG. 2) to let discharging circuit 13 discharge the battery voltage. Power supply controller 14 monitors the battery voltage during discharging and, for example, turns off switch 13a for discharging circuit 13 when the battery voltage reaches predetermined level Vlim. After that, power supply controller 14 goes to step S5.

Meanwhile, if power supply controller 14 determines that the battery voltage is not higher than predetermined level Vlim ("No" in step S3), power supply controller 14 skips step S4 and goes to step S5.

In step S5, power supply controller 14 sets the target level for the charge voltage given to charging circuit 12 at predetermined level Vlim lower than "Vmax" set during normal operation. An operation mode for information processing device 100 in which the target level "Vlim" lower than battery voltage upper limit Vmax is given to charging circuit 12 is hereinafter referred to as a "charging regulation mode".

When power supply controller 14 puts information processing device 100 into the charging regulation mode (S5), the process of this flowchart ends.

According to the process described above, power supply controller 14 monitors the environment in which information processing device 100 is used (S1 to S2). Then, when power supply controller 14 determines that the use environment for information processing device 100 is inside the conveyance ("Yes" in step S2), power supply controller 14 switches information processing device 100 into the charging regulation mode (S5). In the charging regulation mode, charging circuit 12 charges battery 11 with the target level set at upper limit "Vlim" lower than normal upper limit Vmax.

In this way, the limitation is placed on the battery voltage during charging of battery 11 of information processing device 100 inside the conveyance. This configuration provides a reduction in the risk of ignition or other danger created by battery 11 during the use of information processing device 100 inside the conveyance.

According to the process described above, if the battery voltage held already in battery 11 in a course of switching into the charging regulation mode is higher than predetermined level Vlim ("Yes" in step S3), electricity is discharged until the battery voltage gets less than or equal to predetermined level Vlim (S4). Thus, the battery voltage is compulsorily decreased to less than or equal to predetermined level Vlim if information processing device 100 is carried onto the conveyance. This contributes to improved safety during the use of information processing device 100 inside the conveyance.

In the description given above, power supply controller 14 uses the rate of acceleration detected by acceleration sensor 15 as a criterion to determine the condition in step S2. However, the criterion is not limited to this example. A direction of detected acceleration, a change in a waveform of the acceleration over time, or other data may be, for example, used as a criterion to determine the condition in step S2.

2-2. Charging Regulation Removal Process

Figure 4:
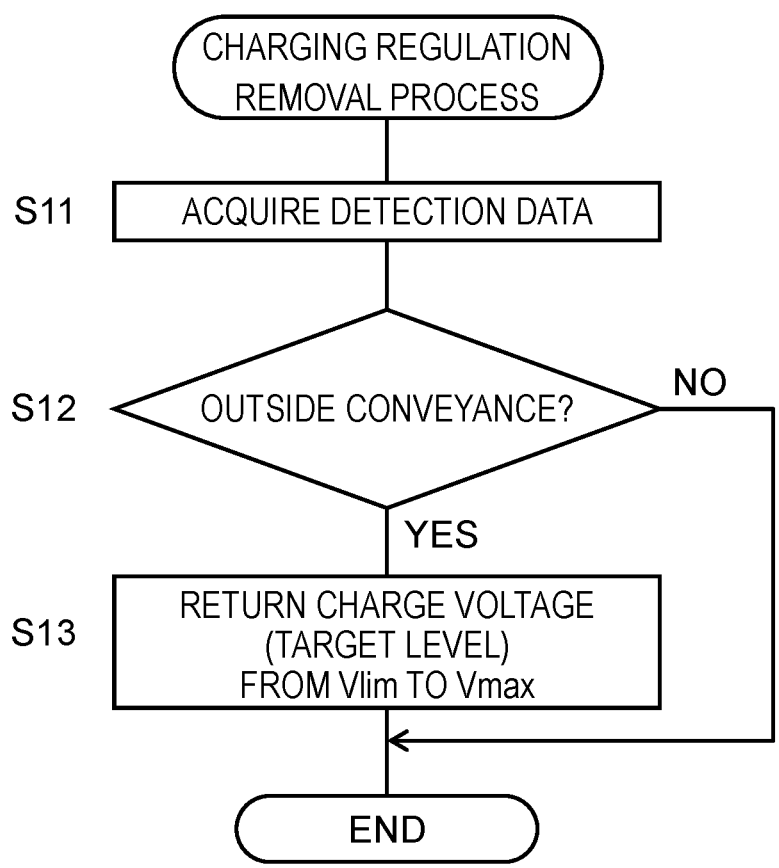
FIG. 4 is a flowchart illustrating a charging regulation removal process executed by the electronic device according to the first exemplary embodiment.

With reference to FIG. 4, a description will be given of a charging regulation removal process that is executed when information processing device 100 goes out of the conveyance to exit from the charging regulation mode set by the charging regulation process described above.

FIG. 4 is a flowchart illustrating a charging regulation removal process executed in this exemplary embodiment. The flowchart in FIG. 4 is, for example, executed at predetermined intervals (e.g., 1 second) if information processing device 100 is put in the charging regulation mode (FIG. 3). Each step in this flowchart is executed by power supply controller 14 of information processing device 100.

First, in a similar way to step S1 in FIG. 3, power supply controller 14, for example, acquires information about the use environment for information processing device 100 at present from each detector (S11). For instance, when the user gets information processing device 100 to exit from the in-flight mode, power supply controller 14 acquires detected data indicating that the in-flight mode is off from CPU 10a.

Next, power supply controller 14 determines whether or not the use environment for information processing device 100 is outside the conveyance based on the acquired detection data (S12). For instance, when the in-flight mode is turned off, power supply controller 14 determines that the use environment for information processing device 100 is outside the conveyance ("Yes" in step S12).

In step S12, in a similar way to step S2 in FIG. 3, power supply controller 14 may, for example, determine that the use environment is outside the conveyance ("Yes" in step S12) if acceleration higher than or equal to a predetermined threshold is detected. The threshold may be, for example, set as in the case of step S2 in FIG. 3 or may be separately set in consideration of factors such as a rate of acceleration measured when an airplane makes a landing.

When power supply controller 14 does not determine that the use environment for information processing device 100 is outside the conveyance ("No" in step S12), this process ends.

When power supply controller 14 determines that the use environment for information processing device 100 is outside the conveyance ("Yes" in step S12), power supply controller 14 sets the target level for the charge voltage given to charging circuit 12 at normal upper limit "Vmax" (S13). Thus, power supply controller 14 gets information processing device 100 to exit from the charging regulation mode.

When power supply controller 14 gets the information processing device to exit from the charging regulation mode (S13), the process of this flowchart ends.

According to the process described above, when sensing that the use environment is outside the conveyance ("Yes" in step S12) after information processing device 100 switches to the charging regulation mode, the power supply controller gets the information processing device to exit from the charging regulation mode (S13). During subsequent charging, in accordance with the target level set at the normal charge voltage "Vmax", charging circuit 12 is allowed to charge battery 11 until the battery voltage reaches upper limit Vmax.

This configuration makes easier the use of information processing device 100 outside the conveyance while assuring safety during the use of information processing device 100 inside the conveyance.

3. Effects and Others

As described above, information processing device 100 according to this exemplary embodiment is an electronic device capable of charging battery 11. Information processing device 100 includes charging circuit 12, power supply controller 14, and detectors such as acceleration sensor 15 and CPU 10a. Charging circuit 12 charges battery 11. Power supply controller 14 controls the charging of battery 11 performed by charging circuit 12. The detectors each detect information about a use environment where information processing device 100 is used. When power supply controller 14 determines that the use environment for information processing device 100 is a specific environment such as inside a conveyance in response to a result detected by the detectors, power supply controller 14 regulates charging performed by charging circuit 12.

When sensing that the use environment for information processing device 100 described above is a specific environment (inside a conveyance) (S2), the power supply controller regulates charging of battery 11 (S5). This configuration provides a reduction in risk involved in the use of information processing device 100 in a conveyance or other public transportation systems.

In this exemplary embodiment, when power supply controller 14 determines that the use environment for information processing device 100 is a specific environment, power supply controller 14 sets the target level for the charge voltage applied by charging circuit 12 to battery 11 at predetermined level Vlim, which is lower than Vmax, a target level set during normal operation (S5). In this way, the power supply controller regulates the charge voltage for battery 11 under a specific environment and thereby contributes to improved safety during the use of information processing device 100 under the environment.

In this exemplary embodiment, if the battery voltage charged in battery 11 is higher than predetermined level Vlim at the time of sensing that the use environment for information processing device 100 is a specific environment (S3), power supply controller 14 controls discharging of the battery to decrease the battery voltage to less than or equal to predetermined level Vlim (S4). Thus, the battery voltage is compulsorily decreased to less than or equal to predetermined level Vlim under the specific environment. This contributes to improved safety during the use of information processing device 100.

In this exemplary embodiment, when power supply controller 14, after starting the charging regulation, determines that the use environment for information processing device 100 is not the specific environment in response to a result detected by the detectors (S12), the power supply controller removes the charging regulation (S13). Hence, if the information processing device gets out of the specific environment, the regulation of charging of battery 11 is removed. This configuration makes easier the use of information processing device 100 while assuring safety under the specific environment.

In this exemplary embodiment, acceleration sensor 15 as a detector detects a rate of acceleration of information processing device 100. If the rate of acceleration detected by acceleration sensor 15 is higher than or equal to a predetermined threshold, ("Yes" in step S2), power supply controller 14 regulates charging (S5). This configuration enables the power supply controller to regulate charging performed by information processing device 100 inside a conveyance that is, for example, traveling at an acceleration rate higher than or equal to the threshold and contributes to improved safety during the use of information processing device 100 inside the conveyance.

In this exemplary embodiment, CPU 10a as a detector detects whether or not information processing device 100 is put in an in-flight mode used to preclude wireless communication. If the detector detects that information processing device 100 is put in the in-flight mode ("Yes" in step S2), power supply controller 14 regulates charging (S5). This configuration contributes to improved safety in a use environment such as inside an airplane where information processing device 100 is put into the in-flight mode.

Other Exemplary Embodiments

As described above, the first exemplary embodiment has been described as an example of the technique disclosed in the present application. However, the technique of the present disclosure is not limited to the exemplary embodiment, and is also applicable to other exemplary embodiments that undergo some modifications, replacements, additions, omissions, or the like, as appropriate. A new exemplary embodiment can also be made by a combination of the components described in the exemplary embodiment. In light of this, other exemplary embodiments will now be shown.

Figure 5:
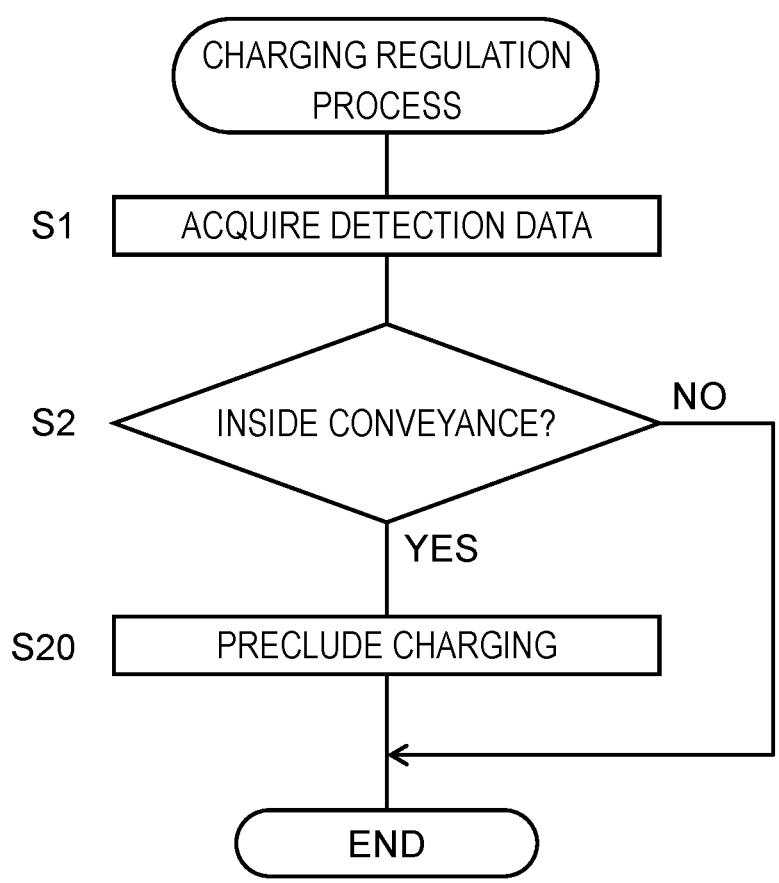
FIG. 5 is a flowchart illustrating a variation on a charging regulation process executed by an electronic device.

In the first exemplary embodiment described above, while information processing device 100 is put in the charging regulation mode, the power supply controller regulates charging, with the target level for the charge voltage set at predetermined level Vlim lower than "Vmax". However, the charging regulation method is not limited to this example. For instance, charging of battery 11 may be precluded. With reference to FIG. 5, this variation will be described.

FIG. 5 is a flowchart illustrating a variation on the charging regulation process executed by information processing device 100. In the flowchart of FIG. 5, power supply controller 14 of information processing device 100 executes steps S1, S2 as in FIG. 3. When power supply controller 14 determines that information processing device 100 is inside a conveyance ("Yes" in step S2), the power supply controller puts the information processing device into a charging regulation mode so as to preclude charging circuit 12 from charging battery 11 (S20).

When information processing device 100 is put into this charging regulation mode (S20), charging circuit 12 does not perform charging even if the user, for example, connects the commercial power supply with information processing device 100 through AC adapter 30 afterward to charge information processing device 100. This configuration provides a further reduction in risk involved in the use of information processing device 100 put into the charging regulation mode.

In the description given above, when "Yes" is selected in step S2, the power supply controller regulates charging of battery 11 (S20). Power supply controller 14 may execute step S20 after executing steps S3, S4 in common with the first exemplary embodiment.

In common with the first exemplary embodiment, information processing device 100, for example, exits from the charging regulation mode selected in step S20 when the use environment for the information processing device is not the specific environment (FIG. 4).

As described above, when sensing that the use environment for information processing device 100 is a specific environment, power supply controller 14 may preclude charging circuit 12 from charging battery 11. Thus, battery 11 is not charged in the specific environment. This contributes to improved safety during the use of information processing device 100.

In the exemplary embodiments described above, the commercial power supply is, for example, connected with information processing device 100 through AC adapter 30 to charge battery 11. However, the method of charging battery 11 is not particularly limited. Battery 11 may be charged through a USB (universal serial bus) cable, for example.

In the exemplary embodiments described above, components such as acceleration sensor 15 are described as an example of the detectors. However, examples of the detectors according to the present disclosure are not particularly limited to these components and may, for example, include gyro sensors, atmospheric pressure sensors, global positioning system (GPS) receivers, and information transmitters of all sorts. For instance, an atmospheric pressure sensor may be used to detect that the use environment for information processing device 100 is inside an airplane. Power supply controller 14 is able to determine whether or not the use environment for information processing device 100 is a specific environment by putting together data detected with various sensors.

If the detectors used to detect an environment in which information processing device 100 is used are various sensors as described above, power supply controller 14 may use an acceleration rate detected with acceleration sensor 15 as a trigger. In this case, when an acceleration rate higher than or equal to a threshold for the trigger is detected, power supply controller 14 acquires detection data from other detectors to determine the use environment as described above.

In the exemplary embodiments described above, the power supply controller determines that information processing device 100 is inside a conveyance such as an airplane. However, the specific environment subject to detection is not limited to this example. For instance, a specific environment subject to detection may be in a railway vehicle like a Shinkansen train, a ship, or another conveyance, or a specific place.

For instance, power supply controller 14 may receive information about a position of information processing device 100 from a GPS receiver to determine that information processing device 100 is used at a specific place (e.g., an ocean's surface for a ship). A detector may detect switching between base stations with which information processing device 100 establishes communication to enable sensing that information processing device 100 is inside a conveyance.

In the exemplary embodiments described above, information processing device 100 is described as an example of an electronic device. The electronic device according to the present disclosure is not limited to information processing device 100 and may be any of various rechargeable electronic devices such as portable battery chargers. For instance, if a battery for an external device is charged by a portable battery charger, charging of the battery may be regulated.

As described above, the exemplary embodiments have been described as examples of the technique of the present disclosure. For that purpose, the accompanying drawings and the detailed description have been provided.

Accordingly, the constituent elements described in the accompanying drawings and the detailed description may include not only the constituent elements essential for solving the problem but also constituent elements that are not essential for solving the problem in order to illustrate the technique. For this reason, it should not be immediately deemed that those unessential components are essential just because those unessential components are described in the accompanying drawings and the detailed description.

The above exemplary embodiments are provided to exemplify the technique according to the present disclosure, and various changes, replacements, additions, omissions, and the like can be made within the scope of the claims and equivalents thereof.

INDUSTRIAL APPLICABILITY

The present disclosure is applicable to various rechargeable electronic devices such as information processing devices and portable battery chargers of all sorts.

What is claimed is:

1. An electronic device that charges a battery, the electronic device comprising:
a charging circuit configured to charge the battery;
a power supply controller configured to control charging of the battery performed by the charging circuit; and
a detector configured to detect information about a use environment where the electronic device is used, wherein when the power supply controller determines that the use environment for the electronic device is a specific environment based on the information detected by the detector, the power supply controller regulates the charging performed by the charging circuit, when the power supply controller determines that the use environment for the electronic device is the specific environment, the power supply controller sets a target level for a charge voltage to be applied by the charging circuit to the battery to a predetermined level that is lower than a target level during normal operation, and on condition that battery voltage charged in the battery is higher than the predetermined level when the power supply controller determined that the use environment for the electronic device is the specific environment, the power supply controller causes the battery to discharge until the battery voltage is decreased to the target level lower than the target level during normal operation.

2. The electronic device according to claim 1, wherein when the power supply controller determines that the use environment for the electronic device is the specific environment, the power supply controller precludes the charging circuit from charging the battery.

3. The electronic device according to claim 1, wherein when the power supply controller, after starting regulation of the charging, determines that the use environment for the electronic device is not the specific environment based on the information detected by the detector, the power supply controller removes the regulation of the charging.

4. The electronic device according to claim 1,
wherein the detector detects, as the information, a rate of acceleration of the electronic device, and
wherein the power source controller regulates the charging on condition that the rate of acceleration detected by the detector is higher than or equal to a predetermined threshold.

5. The electronic device according to claim 1,
wherein the detector detects, as the information, whether or not the electronic device is put in an operation mode used to preclude wireless communication, and
wherein the power source controller regulates the charging when the detector detects that the electronic device is put in the operation mode.

6. The electronic device according to claim 1, wherein the power source controller regulates the charging when the power source controller determines that the electronic device is used in at least one of a conveyance including an airplane, a ship, and a railway vehicle.

7. The electronic device according to claim 1, wherein the detector includes at least one of an acceleration sensor, a gyro sensor, an atmospheric pressure sensor, and a global positioning system (GPS) receiver.

* * * * *